United States Patent
Kim et al.

(10) Patent No.: US 10,616,834 B2
(45) Date of Patent: Apr. 7, 2020

(54) APPARATUS AND METHOD FOR CONTROLLING TRANSMISSION POWER OF DMRS IN NEW RADIO

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 16/131,686

(22) Filed: Sep. 14, 2018

(65) Prior Publication Data
US 2019/0090199 A1 Mar. 21, 2019

(30) Foreign Application Priority Data

Sep. 15, 2017 (KR) .................. 10-2017-0118757
Jul. 4, 2018 (KR) .................. 10-2018-0077435

(51) Int. Cl.
| H04W 52/06 | (2009.01) |
| H04W 52/36 | (2009.01) |
| H04W 52/24 | (2009.01) |
| H04W 52/32 | (2009.01) |
| H04W 52/28 | (2009.01) |
| H04L 5/00 | (2006.01) |
| H04W 52/14 | (2009.01) |

(52) U.S. Cl.
CPC .......... *H04W 52/06* (2013.01); *H04L 5/0051* (2013.01); *H04W 52/143* (2013.01); *H04W 52/246* (2013.01); *H04W 52/281* (2013.01); *H04W 52/325* (2013.01); *H04W 52/362* (2013.01)

(58) Field of Classification Search
CPC . H04W 52/06; H04W 52/362; H04W 52/325; H04W 52/246; H04W 52/143; H04W 52/281; H04W 72/042; H04L 5/0051; H04L 1/1861
USPC ........................................................ 455/522
See application file for complete search history.

(56) References Cited

U.S. PATENT DOCUMENTS

2012/0207119 A1* 8/2012 Zhang ................... H04L 5/0023
                                                                  370/329
2018/0084572 A1* 3/2018 You ........................... H04L 5/00

OTHER PUBLICATIONS

ZTE, "Evaluation results on DL DMRS", R1-1710197, 3GPP TSG RAN WG1 NR Ad-Hoc#2, Qingdao, P.R. China Jun. 27-30, 2017.
China Telecom, "Multiplexing between front-load DMRS and data for CP-OFDM", R1-1714127, 3GPP TSG RAN WG1 Meeting #90, Prague, P.R. Czechia, Aug. 21-25, 2017, pp. 1-3.
NTT Docomo, Inc., "Discussion on DMRS Design", R1-1702800, 3GPP TSG RAN WG1 Meeting #88, Athens, Greece Feb. 13-17, 2017, pp. 1-10.

* cited by examiner

*Primary Examiner* — Shaima Q Aminzay
(74) *Attorney, Agent, or Firm* — IP Legal Services, LLC

(57) ABSTRACT

Provided is a method of a base station for controlling the transmission power of a demodulation reference signal (DMRS) to a user equipment. The method may include determining a ratio of one or more empty resource elements to one or more DMRS resource elements over one or more DMRS symbols, determining a DMRS power boosting based on the determined ratio value, and transmitting the DMRS with power determined based on the DMRS power boosting to the user equipment.

9 Claims, 14 Drawing Sheets

APPARATUS AND METHOD FOR CONTROLLING TRANSMISSION POWER OF DMRS IN NEW RADIO

CROSS-REFERENCE TO RELATED APPLICATION

This application claims the priority benefit of Korean Patent Application No. 10-2017-0118757, filed on Sep. 15, 2017 and No. 10-2018-0077435, filed on Jul. 4, 2018 in the Korean Intellectual Property Office, the disclosures of which are incorporated herein by reference in their entirety.

BACKGROUND OF THE INVENTION

1. Field of the Invention

The present disclosure relates to a method and apparatus for controlling transmission power of a demodulation reference signal (DMRS) in a next-generation/5G radio access network (hereinafter, referred to as a new radio (NR)).

2. Description of the Related Art

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR as flexible frame structures, compared with the LTE/LTE-Advanced.

In particular, there is a growing need to determine a specific method of boosting transmission power of the DMRS, considering DMRS resource elements (RE) and data resource elements multiplexed over one or more DMRS symbols when a base station transmits DMRS to a user equipment in the NR.

SUMMARY OF THE INVENTION

An object of the present disclosure is to provide a method of boosting the transmission power of a demodulation reference signal (DMRS) when a base station transmits the DMRS to a user equipment, in the NR.

In accordance with an aspect of the present disclosure, a method of a base station may be provided for transmitting a demodulation reference signal (DMRS) to a user equipment. The method may include determining a ratio of one or more empty resource elements to one or more DMRS resource elements over one or more DMRS symbols, determining a DMRS power boosting based on the determined ratio value, and transmitting the DMRS with power determined based on the DMRS power boosting to the user equipment.

In accordance with an aspect of the present disclosure, a method of a user equipment may be provided for receiving a demodulation reference signal (DMRS) from a base station. The method may including receiving information on a ratio value of one or more empty resource elements to one or more DMRS resource elements over one or more DMRS symbols, and receiving a power-boosted DMRS according to DMRS power boosting determined based on the ratio value from the base station.

In accordance with an aspect of the present disclosure, a base station may be provided for transmitting a demodulation reference signal (DMRS) to a user equipment. The base station may include a controller configured to determine a ratio of one or more empty resource elements to one or more DMRS resource elements over one or more DMRS symbols and determine DMRS power boosting based on the determined ratio value, and a transmitter configured to transmit the DMRS with power determined based on the DMRS power boosting to the user equipment.

In accordance with an aspect of the present disclosure, a user equipment may be provided for receiving a demodulation reference signal (DMRS) from a base station. The user equipment may include a receiver configured to receive information on a ratio of one or more empty resource elements to one or more DMRS resource elements over one or more DMRS symbols, and receive a power-boosted DMRS according to DMRS power boosting determined based on the ratio value from the base station.

In accordance with an aspect of the present disclosure, the transmission power of the DMRS may be boosted when a base station transmits the DMRS to a user equipment, in the NR.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION OF THE EXEMPLARY EMBODIMENTS

Figure 1:
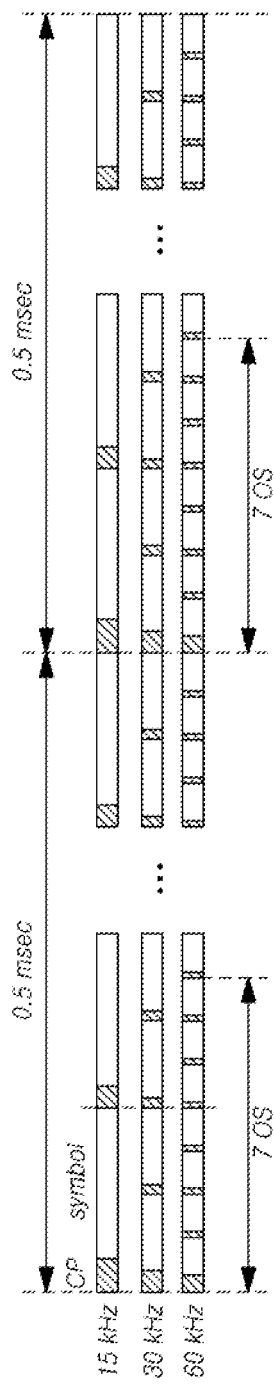
FIG. 1 is a diagram illustrating arrangements of orthogonal frequency division multiple (OFDM) symbols in a case where different subcarrier spacings from each other are used according to some embodiments of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes a user equipment (UE) and a base station (BS).

In the present disclosure, the UE is defined as a generic term including devices using in wireless communication, such as a UE supporting wideband code division multiple access (WCDMA), long term evolution (LTE), high speed packet access (HSPA), international mobile telecommunications (IMT)-2020 (5G or new radio), or the like, or a mobile station (MS) supporting a global system for mobile communications (GSM), a user terminal (UT), a subscriber station (SS), a wireless device, or the like.

The BS or a cell generally refers to a station communicating with the UE. The BS or cell of the present disclosure is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The BS, which provides radio coverage, presents in each of the above-described various cells, and therefore the BS may be classified into two categories. 1) The BS may be an apparatus that covers a megacell, a macrocell, a microcell, a picocell, a femtocell, and a small cell, in association with a wireless area, or 2) the BS may indicate a radio coverage area itself. The former BS may be apparatuses providing any radio coverage area and controlled by an identical entity, or all apparatuses interacting with each other to cooperatively establish the radio coverage area. According to a method of establishing the radio coverage area, a point, a transmission/reception point, a transmission point, a reception point, or the like can be an example of the BS. The latter BS may be a radio coverage area itself to transmit or receive a signal from a UE or neighboring BS perspective.

The cell of the present disclosure may refer to a coverage of a signal transmitted from a transmission point or a transmission/reception point, a component carrier having the coverage of the signal transmitted from the transmission point or the transmission/reception point, or the transmission/reception point itself.

The user equipment and the BS of the present disclosure are entities of performing uplink and downlink communications used to embody the technology and technical conceptions described in the present disclosure. The user equipment and the BS are defined as a generic term and not limited to a specific term or word.

The uplink (UL) refers to a scheme for a user equipment to transmit data to or receive data from a base station, and the downlink (DL) refers to a scheme for a base station to transmit or receive data to/from a user equipment.

The uplink/downlink transmission may be performed i) by utilizing a time division duplex (TDD) technique that performs transmission by the allocation of different time slots, ii) by utilizing a frequency division duplex (FDD) technique that performs transmission by the allocation of different frequencies, or iii) by employing both the frequency division duplex (FDD) and the time division duplex (TDD).

Further, a related standard of the wireless communication system has been developed by the configuration of the UL/DL based on a single carrier or a pair of carriers.

According to UL/DL configuration, control information may be transmitted through a control channel of an uplink or downlink channel, such as a physical DL control channel (PDCCH), a physical UL control channel (PUCCH), and the like. Furthermore, data may be transmitted through a data channel of the uplink or downlink channel, such as a physical DL shared channel (PDSCH), a physical UL shared channel (PUSCH), and the like.

The DL may refer to communication or a communication path from multiple transmission/reception points to a device, or the UL may refer to communication or a communication path from the device to the multiple transmission/reception points. In the DL, a transmitter may be a part of multiple transmission/reception points and a receiver may be a part of the device. In the UL, a transmitter may be a part of the device and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling contains radio resource control (RRC) signaling transmitting RRC information containing an RRC parameter.

The BS performs DL transmission to the device. The BS may transmit a physical DL control channel for transmitting DL control information such as scheduling required to receive a DL data channel that is a primary physical channel for unicast transmission, and scheduling approval information for transmission on an UL data channel. Hereinafter, transmission and reception of a signal through each channel may be described as transmission and reception of a corresponding channel.

Any of multiple access techniques may be applied to wireless communication systems of the present disclosure, and therefore no limitation is imposed on them. The multiple access techniques that can be used in wireless communication systems of the present disclosure may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

A machine type communication (MTC) device of the present disclosure may refer to a device that is low cost (or low complexity), a user equipment that supports coverage enhancement, or the like. The MTC device of the present disclosure may refer to a device defined as a predetermined category for low costs (or low complexity) and/or coverage enhancement.

In other words, the MTC device of the present disclosure may refer to a low cost (or low complexity) device category/type newly defined in 3GPP Release-13 and performing LTE-based MTC related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC device may refer to a further enhanced MTC device defined in Release-14.

A narrowband Internet of Things (NB-IoT) device of the present disclosure refers to a device supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra reliable and low latency communication (URLLC) are proposed as representative usage scenarios for NR having been discussed in the 3GPP recently.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

[5G NR]

An enhanced mobile broadband (eMBB), massive machine-type communication (mMTC), and ultra reliable and low latency communication (URLLC) are proposed as representative usage scenarios for NR.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

Recently, the 3rd generation partnership project (3GPP) has approved the "Study on New Radio Access Technology", which is a study item for research on next-generation/5G radio access technology. On the basis of the Study on New Radio Access Technology, there are several projects under discussion for the new radio (NR), such as, frame structures, channel coding and modulation, waveforms and multiple access schemes, and the like.

It is required to design the NR not only to provide an improved data transmission rate as compared with the long term evolution (LTE)/LTE-Advanced, but also to meet various requirements per detailed and specific usage scenario. An enhanced mobile broadband (eMBB), massive machine-type communication (mMTC), and ultra reliable and low latency communication (URLLC) are proposed as representative usage scenarios of the NR. In order to meet the requirements per usage scenario, it is required to design the NR as flexible frame structures, compared with the LTE/LTE-Advanced.

Since each usage scenario imposes different requirements for data rates, latency, coverage, etc., there is a growing need for a method of efficiently multiplexing radio resource units based on numerologies (e.g., a subcarrier spacing (SCS), a subframe, a transmission time interval (TTI), etc.) different from each other, as a solution for efficiently satisfying requirements according to usage scenarios through a frequency band provided to an arbitrary NR system.

To this end, there have been discussions about a method supporting requirements by multiplexing numerologies having different SCS values from each other based on TDM, FDM or TDM/FDM through one NR carrier, and a method of supporting one or more time units in configuring scheduling units in a time domain. In this regard, in the NR, a subframe has been defined as one type of time domain structure, and a single subframe duration comprised of 14 OFDM symbols of 15 kHz SCS-based normal CP overhead, the same as the LTE, as reference numerology to define a subframe duration, has been defined. Therefore, the subframe in the NR may have a time duration of 1 ms.

Unlike the LTE, since the subframe in the NR is an absolute reference time duration, a slot and a mini-slot may be defined as a time unit forming the basis of actual UL/DL data scheduling. In this case, the number of OFDM symbols which constitutes a slot, a value of y, has been defined as y=14 regardless of the numerology.

Therefore, any slot may be formed of 14 symbols. In accordance with a transmission direction for the slot, all of the symbols may be used for DL transmission or UL transmission, or the symbols may be used in the configuration of a DL portion+a gap+a UL portion.

Further, a mini-slot formed of fewer symbols than a typical slot has been defined in any numerology (or SCS). As a result, a short time domain scheduling interval for an UL/DL data transmission or reception based on the mini-slot may be configured based on the mini-slot. Also, a long-time domain scheduling interval for the UL/DL data transmission or reception may be configured by slot aggregation.

Particularly, in the case of the transmission or reception of latency critical data, such as the URLLC, when scheduling is performed on a per-slot basis based on 0.5 ms (7 symbols) or 1 ms (14 symbols) defined in a frame structure based on a numerology having a small SCS value, for example, 15 kHz, latency requirements may be difficult to be satisfied. To this end, a mini-slot formed of fewer OFDM symbols than the typical slot may be defined. Thus, the scheduling for the latency critical data, such as the URLLC, may be performed based on the mini-slot.

Further, there has been discussions on a method of scheduling data in accordance with latency requirements based on the length of a slot (or mini-slot) defined for each numerology, by multiplexing numerologies having different SCS values from each other in one NR carrier, using the TDM or FDM technique, as described above, to support requirements. For example, since the length of a symbol for the SCS of 60 kHz as shown in FIG. 1 is shortened by about a fourth of that for the SCS of 15 kHz, when one slot is formed of seven OFDM symbols in both the cases, the length of the slot based on the SCS of 15 kHz is 0.5 ms, whereas the length of the slot based on the SCS of 60 kHz is shortened to about 0.125 ms.

As described above, methods of satisfying each requirement of URLLC and eMBB have been discussed by defining different SCSs or different TTI lengths in the NR.

[NR DMRS]

A total of 8 antenna ports from 7 up to 14 to support 8-layer transmission is defined for a DL DMRS of the typical LTE-A (Hereinafter, an antenna port for a DMRS may be referred to as a DMRS port.)

Figure 2:
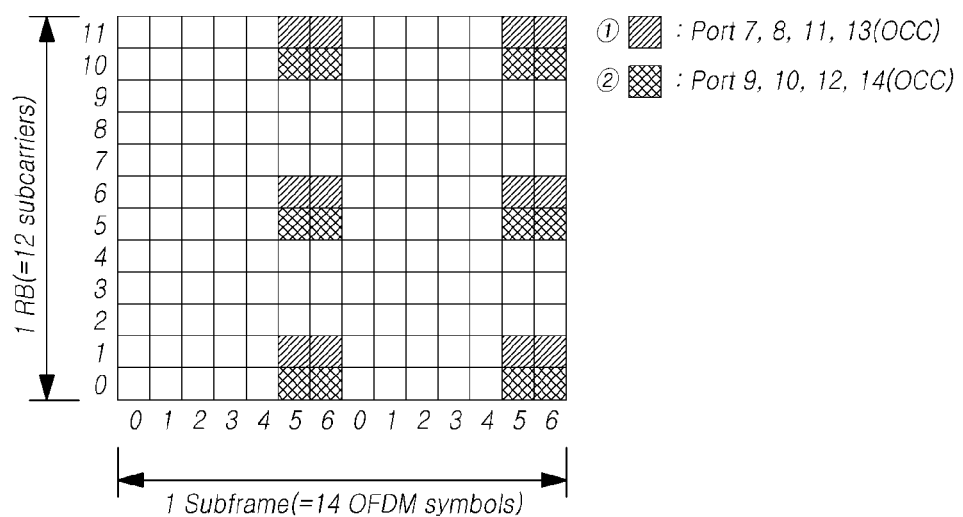
FIG. 2 is a diagram illustrating a downlink (DL) DMRS structure in LTE-Advanced (LTE-A)

FIG. 2 illustrates a DMRS structure to which an orthogonal cover code (OCC) is applied for PDSCH transmission in an LTE DL. Referring to FIG. 2, antenna ports 7, 8, 11, and 13 may use DMRS resource elements (RE) indicated with the pattern ① in FIG. 2, and antenna ports 9, 10, 12, and 14 may use DMRS REs indicated with the pattern ②

At this time, an orthogonal cover code (OCC) is used to maintain orthogonality between antenna ports allocated to the same DMRS REs. The values of the code are shown in table 1 below.

TABLE 1

| The sequence $\overline{w}_p(i)$ for normal cyclic prefix | |
| --- | --- |
| Antenna port p | $[\overline{w}_p(0)\ \overline{w}_p(1)\ \overline{w}_p(2)\ \overline{w}_p(3)]$ |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The related specification defined in conjunction with a DL DMRS of the NR is as follows.

A UE is configured by higher layers with DMRS pattern either from the front-loaded DMRS Configuration type 1 or from the front-loaded DMRS Configuration type 2 for DL/UL:

Configuration type 1:
  One symbol: Comb 2+2 cyclic shift (CS), up to 4 ports
  Two symbols: Comb 2+2 CS+TD-OCC ({1 1} and {1 −1}), up to 8 ports
Note: It should be possible to schedule up to 4 ports without using both {1, 1} and {1, −1}.
Configuration type 2:
  One symbol: 2-FD-OCC across adjacent REs in the frequency domain up to 6 ports
  Two symbols: 2-FD-OCC across adjacent REs in the frequency domain+TD-OCC (both {1, 1} and {1, −1}) up to 12 ports
Note: It should be possible to schedule up to 6 ports without using both {1, 1} and {1, −}.
From UE perspective, frequency domain CDMed DMRS ports are QCLed.
FFS: Whether the front-load DMRS configuration type for a UE for UL and DL can be different or not.)

Note: If there are significant complexity/performance issues involved in the above agreements, down-selection can still be discussed.

A total of two types of DMRS can be supported for the NR DMRS. A type of a DMRS to be used may be determined by a configuration according to the maximum number of DMRS ports.

Front-loaded DMRS configuration 1: Comb+CS structure+TD-OCC

Front-loaded DMRS configuration 2: FD-OCC+TDM/TD-OCC

Hereinafter, the front-loaded DMRS configuration 1 and front-loaded DMRS configuration 2 may be referred to as a first and second DMRS configuration types respectively.

Comb+CS Based DMRS Structure (Supporting Up to 8 DMRS Ports)

Two types of structure may be defined in the front-loaded DMRS configuration 1 according to the number of symbols through which a DMRS is transmitted. Two structures are a 1-symbol DMRS structure as shown in FIG. 3 and a 2-symbol DMRS structure as shown in FIG. 4.

The 1-symbol DMRS means a DMRS formed of one symbol, and the 2-symbol DMRS means a DMRS formed of two symbols. Accordingly, a specific DMRS may be located in one or two symbol intervals over a resource block.

Figure 3:
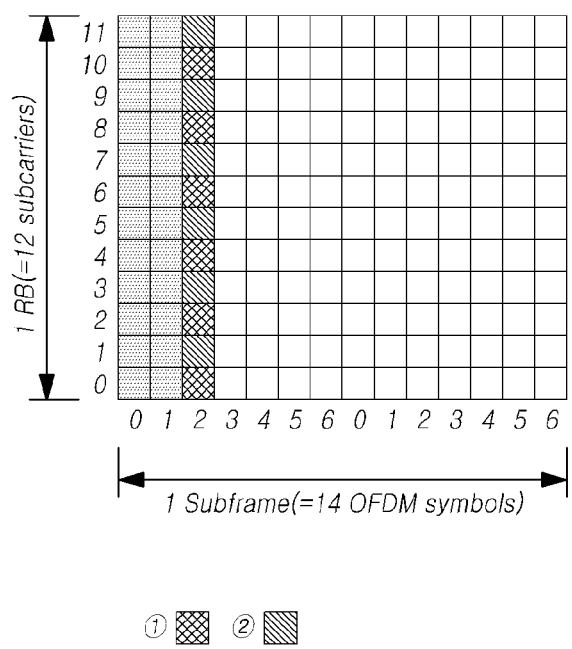
FIG. 3 is a diagram illustrating a 1-symbol DMRS structure configured according to a Comb 2+CS scheme.

For example, as illustrated in FIG. 3, a DMRS may be located over the symbol indicated by the symbol index 2, and the symbol indicated by the symbol index 2 may be a DMRS symbol, that is, a symbol to which the DMRS can be allocated over a resource block.

Figure 4:
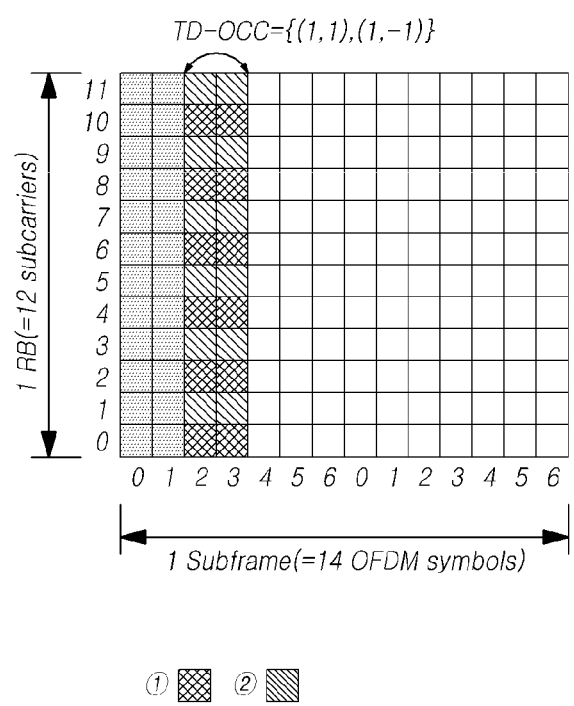
FIG. 4 is a diagram illustrating a 2-symbol DMRS structure configured according to a Comb2+CS scheme.

For another example, as illustrated in FIG. 4, a DMRS may be located over the symbols indicated by symbol index 2 and symbol index 3, and the symbols indicated by the symbol indexes 2 and 3 may be DMRS symbols, that is, symbols to which the DMRS can be allocated over a resource block.

The resource block (RB) is a unit used for a gNB to schedule a data channel or a control channel with a UE, and the resource block is configured in a two-dimensional block type over a frequency axis and a time axis. Each resource block may be formed of several resource elements (RE), and each RE may be indicated by a specific symbol index and subcarrier index. Hereinafter, one resource block will be described as being formed of 14 OFDM symbols over a time axis and formed of 12 subcarriers over a frequency axis, as an example.

In this regard, the Comb relates to a method for mapping a DMRS over a resource block and means that one or more DMRSs configured on a same DMRS port is mapped over subcarriers having a predetermined interval. For example, Comb 2 means that the difference of subcarrier indexes between DMRSs configured on a same DMRS port is configured to be 2 (e.g. DMRSs configured on a DMRS port 0 are located subcarrier indexes 0, 2, 4, 6, 8 and 10.), and Comb 4 means that the difference of subcarrier indexes between DMRSs configured on a same DMRS port is configured to be 4 (e.g. DMRSs configured on a DMRS port 0 are located subcarrier indexes 0, 4 and 8.)

FIG. 3 is a diagram illustrating a 1-symbol DMRS structure configured according to a Comb 2+CS scheme.

First, as illustrated in FIG. 3, in a Comb 2+2 CS structure, a total of 2 areas may be present for each subcarrier. The two areas are distinguished from an area indicated with the pattern ① and an area indicated with the pattern ②, and, when 2 types of cyclic shift is applied to each area, the total of 4 orthogonal ports may be generated.

FIG. 4 is a diagram illustrating a 2-symbol DMRS structure configured according to a Comb2+CS scheme.

Referring to FIG. 4, a 2-symbol DMRS structure may use a pattern in which the 1-symbol DMRS structure is repeated. The difference from the 1-symbol DMRS structure is which method to choose for spreading in the time domain.

For example, in the case of the TD-OCC={(1, 1)}, since it is a simple repetition structure, therefore the number of DMRS ports to support does not increase. However, in the TD-OCC={(1, 1), (1, −1)}, since two additional orthogonal codes are used, therefore the maximum number of DMRS ports to support can be doubled.

FD-OCC Pattern Based DMRS Structure (Supporting up to 12 DMRS Ports) Two structure types may also be defined in the front-loaded DMRS configuration 2 according to the number of symbols through which the DMRS is transmitted. Two structures are a 1-symbol DMRS structure as shown in FIG. 5 and a 2-symbol DMRS structure as shown in FIG. 6.

Figure 5:
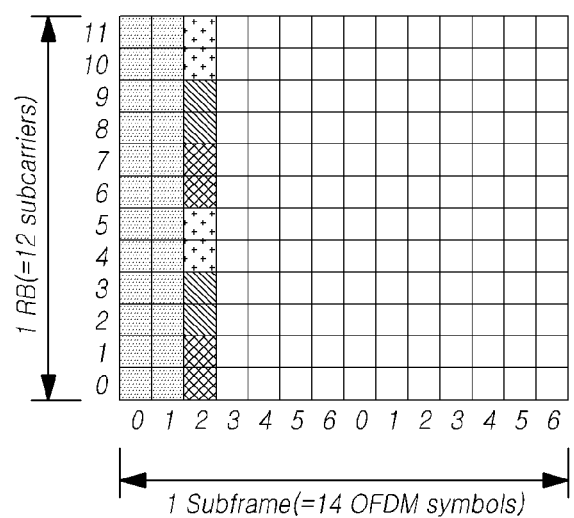
FIG. 5 is a diagram illustrating a 1-symbol DMRS structure configured according to a 2-FD-OCC scheme.
Figure 6:
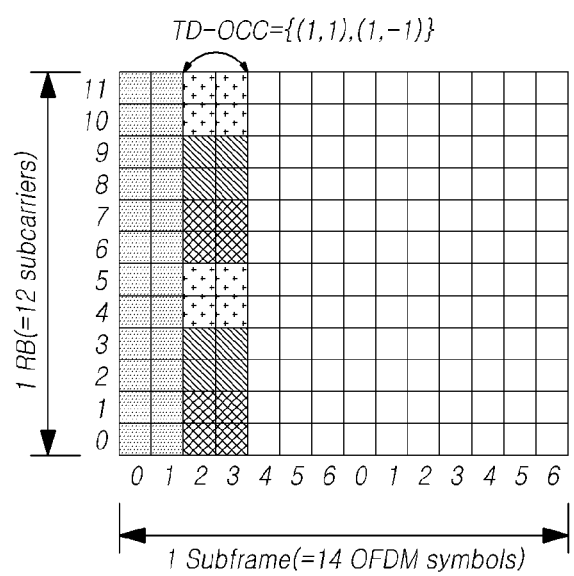
FIG. 6 is a diagram illustrating a 2-symbol DMRS structure configured according to a 2-FD-OCC scheme.

FIG. 5 is a diagram illustrating a 1-symbol DMRS structure configured according to a 2-FD-OCC scheme.

First, as illustrated in FIG. 5, in the structure of a 2-FD-OCC up to 6 ports, 2 consecutive subcarriers across adjacent REs in the frequency domain may be allocated to one DMRS. That is, a DMRS in FIGS. 3 and 4 is located in one subcarrier interval, whereas the DMRS may be located in 2 subcarrier intervals in this embodiment.

In this case, since the 2-FD-OCC basically uses an OCC of length-2 (={(1,1),(1,−1)}), a total of 2 DMRS ports may be supported only in the area indicated with the pattern ①. Accordingly, since a total of three areas indicated with the patterns ①, ② and ③ are provided in FIG. 5, therefore a total of 6 DMRS ports may be supported.

FIG. 6 is a diagram illustrating a 2-symbol DMRS structure configured according to a 2-FD-OCC scheme.

Next, FIG. 6 shows a 2-symbol DMRS structure which is based on an 1-symbol DMRS pattern as a basic structure, and to which the TD-OCC is applied to support up to 12 ports.

For example, in the TD-OCC={(1,1),(1,−1)}, since two additional orthogonal codes are used, therefore 6*2=12 ports can be supported with a total of 2 symbols and 6 ports per symbol.

Hereinafter, various embodiments of a method for controlling transmission power of a DMRS when a gNB transmits the DMRS to a UE based on two DMRS configuration types described above will be described in detail.

Unlike the LTE, in the NR DMRS structure, when one or more DMRS ports are not allocated to any of all REs over a DMRS symbol, that is, when one or more DMRS ports are not allocated to any of all REs located over a symbol over which DMRSs present, the remaining REs become empty REs.

There may be two options for such empty REs: either data are not allocated or are allocated by specific signaling.

As an example in which data are allocated to the empty REs, the data may be transmitted from a gNB to a UE through a DL data channel (PDSCH). Accordingly, multiplexing and rate matching between a DMRS and a PDSCH described below may mean an example of multiplexing and rate matching between one or more PDSCHs and one or more DMRSs.

According to some embodiments of the present disclosure, methods of controlling transmission power of a DMRS will be described considering rate-matching of NR DMRS symbols. In some embodiments, since methods of boosting transmission power of a DMRS will mainly be provided, therefore a method of controlling the transmission power for the DMRS may also be referred to as a method of the power-boosting for the DMRS.

Some embodiments described below may apply to both a front-loaded DMRS symbol area and an additional DMRS symbol area.

Some embodiments described below may be configured individually or in any combination.

Embodiment 1: A DMRS Power-Boosting Configuration Value is Transmitted to a UE by RRC Signaling or MAC Signaling, and the on/Off of Power-Boosting is Performed by Explicit or Implicit Dynamic Signaling For multiplexing between DMRSs and data over one or more DMRS symbols, it is necessary for signaling information related to the DMRS port configuration to the UE. Specific signaling methods being considered may as follows.

Signaling the maximum number of DMRS ports to a UE
Signaling the number of DMRS patterns allocated/unallocated to a UE to the UE
Signaling the number of DMRS groups allocated/unallocated to a UE to the UE However, even though a signaling method is determined as any one of the signaling methods described above, information on multiplexing between DMRSs and data for the UE may be equally applied to the signaling methods of some embodiments of the present disclosure.

Basically, dynamic power allocation for a NR DMRS will be discussed in this embodiment.

In the typical LTE, power control for a PDSCH and a CRS is performed by RRC signaling in a semi-static scheme. However, UE-specific DMRS allocation is performed over one or more DMRS symbols of the NR, and multiplexing between DMRSs and data is performed over one or more DMRS symbols. Therefore, it is impossible for the existing LTE scheme equally to be applied to the NR.

According to some embodiments, instead of directly adding a field for additional power allocation to DL control information (DCI), described is a method of indirectly controlling DMRS power, using information on multiplexing between DMRSs and data.

First, the gNB may transmit one or more RRC configuration values described below to the UE.

Whether power control for a DMRS is applied or not
The frequency of the power control for the DMRS
The number of ports to which the power control for the DMRS is applied
Whether the power control is performed or not according to one or more DMRS configuration types
Whether the power control is performed or not according to the number of DMRS symbols (1-symbol DMRS or 2-symbol DMRS)
Whether the power control is performed or not according to SU/MU-MIMO modes The UE may receive all semi-static configuration values capable of performing the power control for the DMRS, by the higher layer signaling as described above.

Next, the UE may perform dynamic power allocation to the DMRS. Basically, since a DMRS symbol interval may be configured as a 1-symbol interval or a 2-symbol interval, a method of the power allocation to the DMRS may be differently performed according to the length of the symbol interval.

Basically, two methods are available for dynamically performing on/off operation during the procedure of power-boosting or transmission power control for the DMRS.

Controlling transmission power of a DMRS using an additional 1 bit field in DCI (explicit signaling)

Controlling transmission power of a DMRS using existing information (implicit signaling)

In this embodiment, first, it is assumed that power control/boosting for one or more DMRSs is configured in a semi-static manner by RRC signaling. Accordingly, the power control/boosting for an additional DMRS is available at any time in an interval of configuring the DMRS power-boosting.

Although a field representing the on/off operation of the power boosting for the DMRS can be added in DCI, it is also possible to indicate the power boosting in an implicit manner without the corresponding additional information.

At this time, rate matching information on multiplexing between data and DMRSs in an interval of one or more DMRS symbols may be used as the information for indicating the on/off operation of the power boosting in an implicit manner.

At this time, according to a method of transmitting the rate matching information between data and DMRSs, a procedure to which a power boosting message for a DMRS is applied is divided into as follows.

1. Signaling DMRS-PDSCH rate matching information using an RRC-based semi-static signaling manner.

Case 1: Controlling transmission power of a DMRS using an additional 1 bit field in DCI (explicit signaling)

Whether DMRS power control is applied or not based on rate matching information between one or more DMRSs and one or more PDSCHs may be acquired through a field in DCI.

That is, all of the rate matching information and the DMRS power control information between one or more DMRSs and one or more PDSCHs are configured by the RRC signaling, and power boosting information per slot may be signaled to the UE through a separate field in DCI.

Case 2: Performing power control using the existing information (implicit method)

Preforming DMRS power boosting without indication of a specific additional field in DCI. That is, all of rate matching information and DMRS power control information between one or more DMRSs and one or more PDSCHs are configured by the RRC signaling, and a predefined method can be used such that DMRS power control must be performed in a range where both conditions are satisfied.

2. Signaling rate matching information between one or more DMRSs and one or more PDSCHs by dynamic signaling through DCI Case 1: Controlling transmission power of the DMRS using an additional 1 bit field in DCI (explicit signaling)

Whether DMRS power control is applied or not based on rate matching information between one or more DMRSs and one or more PDSCHs may be acquired through the field in DCI.

That is, all of the rate matching information and the DMRS power control information between one or more PDSCHs and one or more DMRSs are configured by the RRC signaling, and the power boosting information per slot may be signaled to the UE through the separate field in DCI.

Case 2: Performing the power control using the existing information (implicit method)

Preforming DMRS power boosting without the indication of a specific additional field in DCI. That is, since whether or not the DMRS power control is performed is configured by the RRC, and rate matching information between one or more DMRSs and one or more PDSCHs is used as signaling for indirectly applying the power control.

That is, the UE can recognize the number of empty REs over one or more DMRS symbols through the rate matching information between one or more PDSCHs and one or more DMRSs. Accordingly, in that case, it is possible to set to perform the power boosting for the DMRS according to the ratio of the number of empty REs to the number of DMRS REs over one or more DMRS symbols. In addition, the gNB may transmit the power boosted DMRS to the UE.

Figure 7:
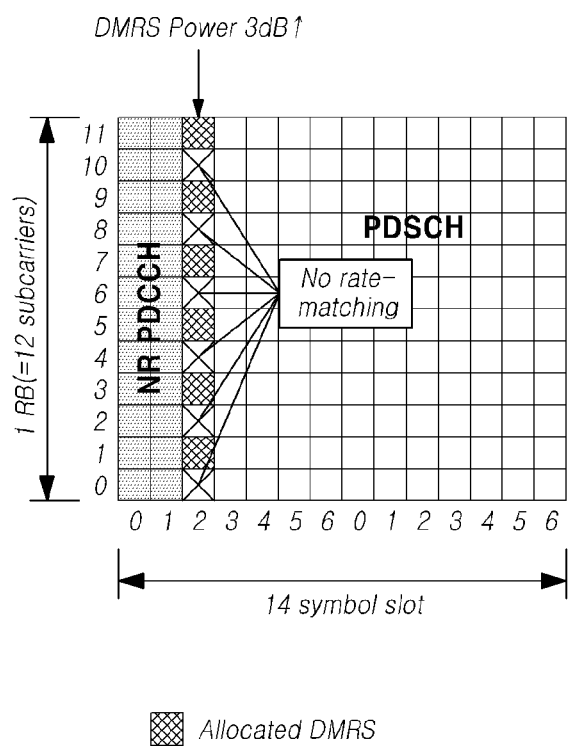
FIG. 7 is a diagram illustrating an example of boosting the transmission power of a DMRS using rate matching information between one or more PDSCHs and one or more DMRSs in a first DMRS configuration type.

Embodiment 1-1: In a First DMRS Configuration Type (Comb+CS), Power Allocation May be Performed Using Rate-Matching Information Between One or More DMRSs and One or More PDSCHs in an Implicit Manner Up to 2 Times According to this embodiment, details of DMRS power boosting specialized to the first DMRS configuration type are proposed. According to this embodiment, the DMRS power boosting may be performed up to 2 times (expressed in 3 dB) in conjunction with rate matching information between one or more DMRSs and one or more PDSCHs. The basic operation method is shown in FIG. 7.

In this embodiment, a process of interpreting the rate matching information between one or more PDSCHs and one or more DMRSs as DMRS power control information is as follows.

1) when data is not allocated to empty REs based on the rate matching information between one or more PDSCHs and one or more DMRSs.

A. The gNB does not perform PDSCH allocation to empty REs over one or more DMRS symbols.

B. The gNB performs power boosting by the ratio of the number of empty REs to the number of DMRS REs for the DMRS.

C. The UE assumes that DMR power boosting is performed by the ratio of the number of empty REs to the number of DMRS REs and performs channel estimation and recovery.

2) when data is allocated to empty REs based on the rate matching information between one or more DMRSs and one or more PDSCHs: the DMRS power-boosting is not performed.

Embodiment 1-2: In a Second DMRS Configuration Type (2-FD-OCC), Power Allocation May be Performed Using Rate-Matching Information Between One or More DMRSs and One or More PDSCHs in an Implicit Manner Up to 3 Times According to this embodiment, details of DMRS power boosting specialized to the second DMRS configuration type are proposed. According to this embodiment, the DMRS power boosting may be performed up to 3 times (expressed in 4.8 dB or 4.77 dB) in conjunction with the rate matching information between one or more DMRSs and one or more PDSCHs. The basic operation method is shown in FIG. 8.

According to this embodiment, a process of interpreting the rate matching information between one or more DMRSs and one or more PDSCHs as the DMRS power control information is as follows.

Figure 8:
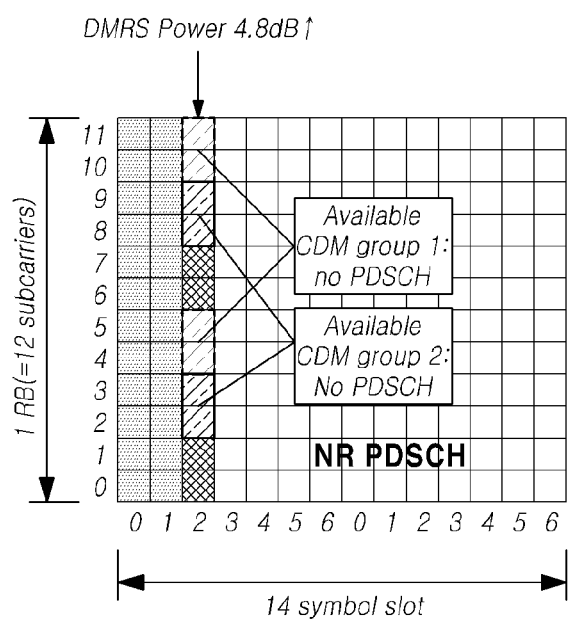
FIG. 8 is a diagram illustrating an example of boosting the transmission power of a DMRS using rate matching information between one or more PDSCHs and one or more DMRSs in a second DMRS configuration type.

1) when data is not allocated to only one CDM group of two CDM groups through the rate matching information between one or more DMRSs and one or more PDSCHs (one or more PDSCHs are allocated to only one of the CDM group 1 and the CDM group 2 of FIG. 8.)

A. The gNB does not perform PDSCH allocation to only a specific CDM group over one or more DMRS symbols.

B. The gNB performs DMRS power boosting by the ratio of the number of empty REs to the number of DMRS REs up to two times (3 dB).

C. The UE assumes that the PDSCH allocation is performed to one CDM group and that the power boosting of the DMRS is performed up to 3 db regardless of the locations of empty REs, and performs channel estimation and recovery.

2) when data is not allocated to all of two CDM groups Through the rate matching between one or more DMRSs and one or more PDSCHs (the PDSCH is not allocated to all of the CDM group 1 or the CDM group 2 of FIG. 8.)

A. The gNB does not perform PDSCH allocation to all CDM groups over one or more DMRS symbols.

B. The gNB performs DMRS power boosting by the ratio of the number of empty REs to the number of DMRS REs up to three times (4.8 dB).

C. The UE assumes that all of two CDM groups are comprised of empty REs, regards that DMRS power boosting is performed up to 4.8 dB, and performs channel estimation and recovery.

3) data is allocated to all of two CDM groups through the rate matching between one or more PDSCHs and one or more DMRSs: The DMRS power boosting is not performed (one or more PDSCHs are allocated to all of the CDM group 1 or the CDM group 2 in FIG. 8)

Considering the embodiments 1-1 and 1-2, the maximum value of the ratio of the number of empty REs to the number of DMRS REs may be differently determined according to DMRS configuration types.

Figure 9:
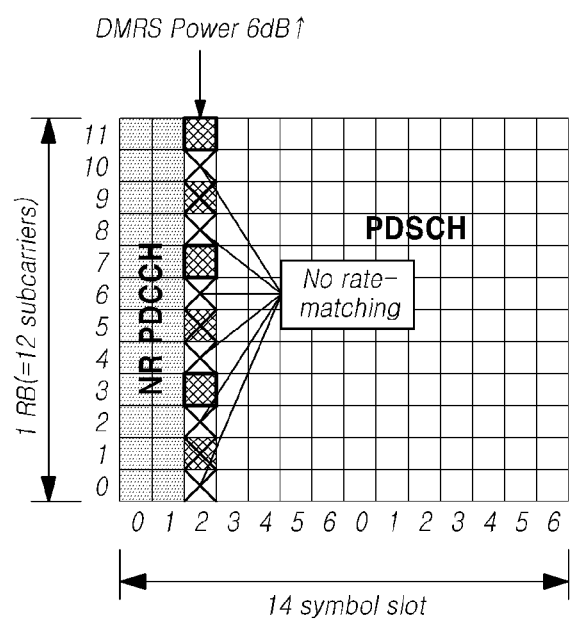
FIG. 9 is a diagram illustrating an example of boosting the transmission power of a DMRS using rate matching information between one or more PDSCHs and one or more DMRSs, and using density information of a DMRS, in a first DMRS configuration type.
Figure 10:
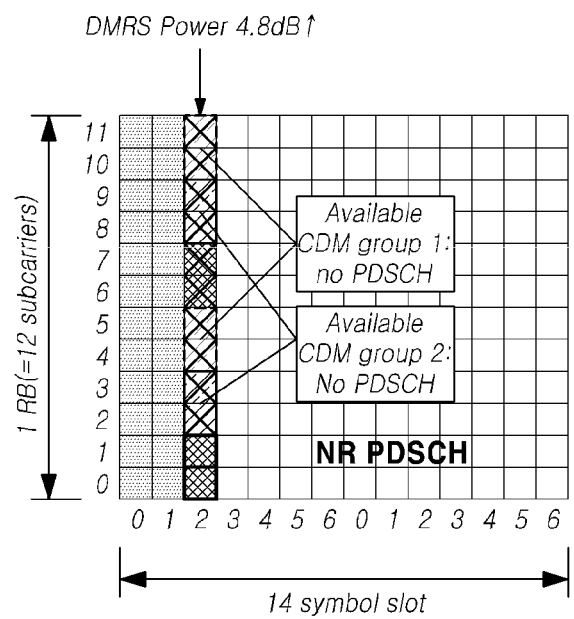
FIG. 10 is a diagram illustrating an example of boosting the transmission power of a DMRS using rate matching information between one or more PDSCHs and one or more DMRSs, and using density information of a DMRS, in a second DMRS configuration type.

Embodiment 1-3: Performing Additional Power Allocation Based on the Ratio of Density Reduction According to a DMRS Configuration In this case, additional power boosting may be performed based on the density reduction of a DMRS. For example, FIG. 9 shows the first DMRS configuration type in a case where the density of a front-loaded DMRS is configured to ½. FIG. 10 shows the second DMRS configuration type in a case where the density of a front-loaded DMRS is configured to ½.

At this time, in the embodiment of the first DMRS configuration type of FIG. 9, when PDSCH rate matching is not additionally performed for the remaining empty REs, the DMRS power boosting may be performed up to 2*2=4 times (6 dB).

On the same principle, in the embodiment of the second DMRS configuration type of FIG. 10, when PDSCH rate matching is not additionally performed for the remaining empty REs the DMRS, power boosting may be performed up to 2*3=6 times (7.8 dB).

Accordingly, when DMRS density related information is simultaneously signaled to the UE, in addition to PDSCH rate matching information, the gNB performs the DMRS power-boosting using all of two types of information described above.

When receiving all of the two types of information through signaling from the gNB, the UE can also derive a power-boosting value of the DMRS by combining the information.

Embodiment 1-4: When DMRS Power Boosting Constraint Value is Configured, Power Boosting is Performed Only at a Specific Power 'Px' or Lower Regardless of Available Power In this embodiment, regardless of the maximum values of the DMRS power boosting which are applied in the embodiments 1, 1-1, 1-2 and 1-3, the DMRS power boosting value is fixed as a specific value 'Px'.

At this time, the value of 'Px' may be a pre-configured value or the gNB may configure a specific 'Px' value to a UE by higher layer signaling.

Embodiment 1-5: Determining on Whether or not DMRS Power Boosting is Performed According to a MU-MIMO Scheme NR MIMO is discussing about non-transparent multi-user (MU) pairing, lately.

The multi-user multiple input and multiple output (MU-MIMO) of the typical LTE/LTE-A is transparent MU-MIMO, therefore a UE has no information on whether or not another UE is pared. In this situation, DMRS power boosting cannot be performed using only rate matching information.

For example, if it is assumed that a UE #1 has recognized an empty RE based on rate-matching information between current PDSCH-DMRS, a DMRS port of a UE #2 may be allocated to the corresponding empty RE.

When the transparent MU-MIMO scheme is used, since the UE #1 cannot recognize whether the UE #2 has allocated a DMRS port to the corresponding empty RE, DMRS power boosting cannot be used.

Accordingly, in this case, as in the embodiment 1, it is effective to directly add in the DCI a field indicating whether DMRS power-boosting is performed to indicate the UE.

However, in the non-transparent MU pairing, the gNB may transmit the maximum number of DMRS ports to the UE or transmit PDSCH rate-matching information considering MU pairing situation to the UE. As a result, the UE, based on the number of its DMRS ports, can recognize whether there is a multiuser pairing (MU pairing) for its current DMRS symbol area. Accordingly, the embodiments 1-1 to 1-4 described above may be equally applied to the DMRS power-boosting of the UE.

That is, the gNB may cause the DMRS power-boosting not to be performed, considering a transparent/non-transparent MU-MIMO scheme, or cause the DMRS power-boosting to be performed only when the gNB can transmit the maximum number of DMRS ports to a target UE.

Figure 11:
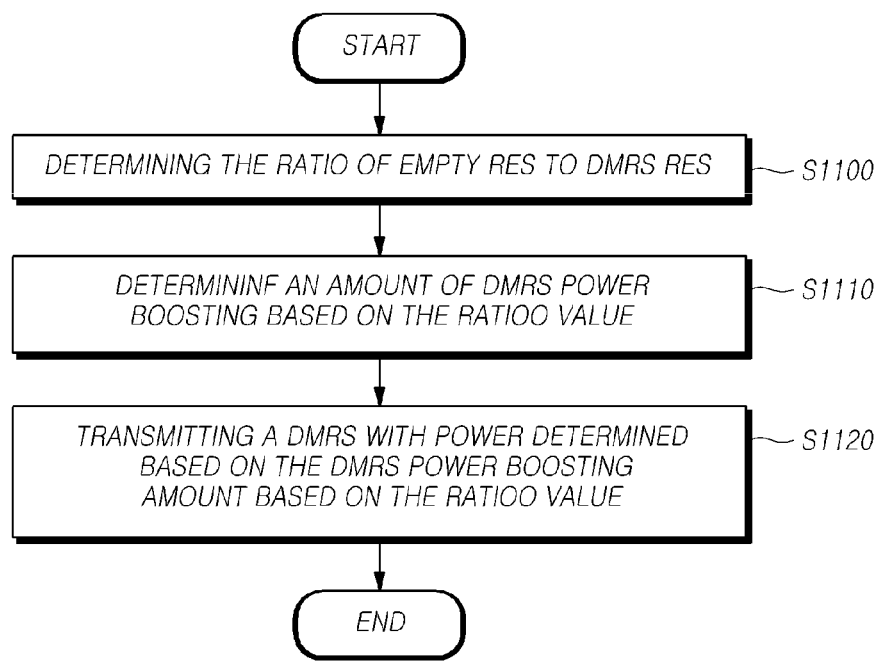
FIG. 11 is a flowchart illustrating a method of a base station for transmitting a DMRS to a user equipment according to some embodiments of the present disclosure.

FIG. 11 is a flowchart illustrating a method of a gNB for transmitting a DMRS to a UE according to some embodiments of the present disclosure.

Referring to FIG. 11, the gNB may determine the ratio of empty REs to DMRS REs over one or more DMRS symbols (i.e., in one or more symbols) to which a DMRS can be allocated in a resource block S1100. The gNB may transmit a DMRS to the UE through one or more DMRS REs.

At this time, the ratio of empty REs to DMRS REs may be determined through information indicating an effective RE pattern available to the UE among one or more available RE patterns configured by the gNB.

An available RE basically means a RE to which a DMRS is not allocated over one or more DMRS symbols. Further, a pattern of the available REs means bundle information on the corresponding available REs. At this time, pattern structures of available REs may be different from each other according to a DMRS configuration type described above.

Such an available RE pattern may be referred to as a CDM (Code Division Multiplexing) group, but is not limited to any term or word. That is, the CDM group in the above-described embodiment may be interpreted in the same meaning as the available RE pattern. And data may not be allocated to empty REs and CDM group without data might be configured with empty REs with no data allocated. The available RE pattern may be comprised of REs to which a DMRS is not allocated, among REs located over one or more DMRS symbols, i.e., one or more symbols to which a DMRS can be allocated in an RB. The gNB may configure one or more available RE patterns and transmit information indicating an available RE pattern available to the UE among the configured available RE patterns. At this time, the information indicating the available RE pattern available to the UE may be transmitted to the UE through DL control information (DCI).

Further, when the gNB transmits to the UE the information indicating the available RE pattern available to the UE, instead of using a separate independent field in the DL control information, corresponding indication information may be included in a field indicating antenna port information and then transmitted to the UE.

Further, information indicating the number of available RE patterns available to the UE may be included in the information indicating an available RE pattern available to the UE. For example, the number of available RE patterns available to the UE may be 1, 2 or 3, and, based on information on the corresponding number, the UE can recognize which available RE pattern is available (e.g. If the number is 1, 2 or 3, a first, second or third available RE pattern respectively is available.)

For example, the ratio of empty REs to DMRS REs may be determined as one of 1, 2 and 3. Further, the maximum value of the ratio value of empty REs to DMRS REs may be determined differently according to the DMRS configuration types.

In addition, the gNB may determine DMRS power boosting based on the ratio value of empty REs to DMRS REs described above S1110. DMRS power boosting means the ratio of energy of a DMRS RE to energy of a RE to which data (e.g. PDSCH) is transmitted.

For an example, if the DMRS configuration type is a first DMRS configuration type (Comb+CS), the maximum value of the ratio of empty REs to DMRS REs may be determined as 2, and the maximum value of DMRS power boosting may be determined as 3 dB.

For another example, if the DMRS configuration type is a second DMRS configuration type (2-FD-OCC), the maximum value of the ratio of empty REs to DMRS REs may be determined as 3, and the maximum value of DMRS power boosting may be determined as 4.77 dB.

In addition, the gNB may transmit a DMRS with power determined based on the DMRS power boosting described above to the UE S1120.

Figure 12:
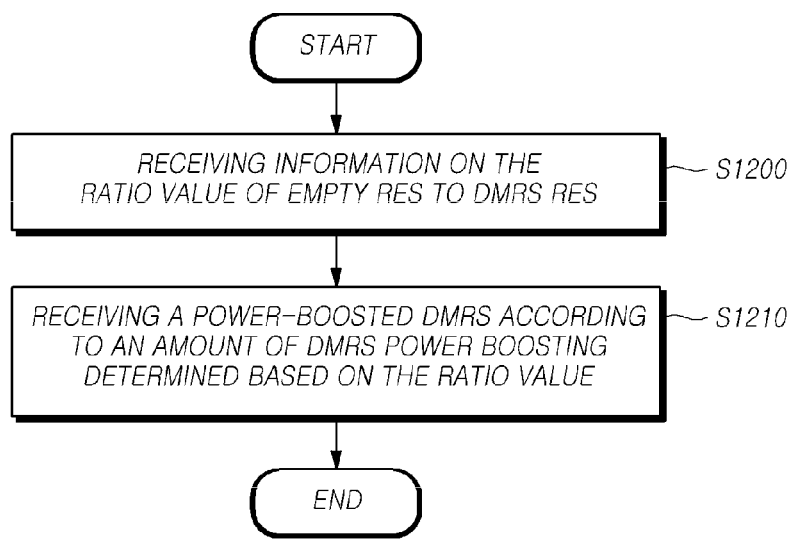
FIG. 12 is a flowchart illustrating a method of a user equipment for receiving a DMRS from a base station according to some embodiments of the present disclosure.

FIG. 12 is a flowchart illustrating a method of a UE for receiving a DMRS from a gNB, according to some embodiments of the present disclosure.

Referring to FIG. 12, the UE may receive information on the ratio value of empty REs to DMRS REs over one or more DMRS symbols, i.e., in one or more symbols to which a DMRS can be allocated in an RB S1200. The UE may receive a DMRS from the gNB through one or more DMRS REs, and transmit/receive data to/from the gNB, i.e., transmit UL data to or receive UL data from the gNB, through one or more empty REs.

The ratio of empty REs to DMRS REs may be determined through information indicating an effective RE pattern available to the UE among one or more available RE patterns configured by the gNB.

The available RE pattern may be comprised of REs to which a DMRS is not allocated, among REs located over one or more DMRS symbols, i.e., one or more symbols to which a DMRS can be allocated in an RB. The gNB may configure one or more available RE patterns and transmit information indicating an available RE pattern available to the UE among the configured available RE patterns. At this time, the information indicating an available RE pattern available to the UE may be transmitted to the UE through DL control information (DCI).

Further, when the gNB transmits to the UE the information indicating the available RE pattern available to the UE, instead of using a separate independent field in the DL control information, a corresponding indication information may be included in a field indicating antenna port information and then transmitted to the UE.

Further, information indicating the number of available RE patterns available to the UE may be included in the information indicating an available RE pattern available to the UE. For example, the number of available RE patterns available to the UE may be 1, 2 or 3, and, based on information on the corresponding number, the UE may recognize which available RE pattern is available (e.g. If the number is 1, 2 or 3, a first, second or third available RE pattern respectively is available.)

For example, the ratio of empty REs to DMRS REs may be determined as one of 1, 2 and 3. Further, the maximum value of the ratio value of empty REs to DMRS REs may be determined differently according to the DMRS configuration types.

In addition, the UE may receive a power-boosted DMRS from the gNB according to a DMRS power boosting determined based on the ratio value of empty REs to DMRS REs described above S1210.

For example, if the DMRS configuration type is a first DMRS configuration type, the maximum value of the ratio of empty REs to DMRS REs may be determined as 2, and the maximum value of DMRS power boosting may be determined as 3 dB.

For another example, if the DMRS configuration type is a second DMRS configuration type, the maximum value of the ratio of empty REs to DMRS REs may be determined as 3, and the maximum value of DMRS power boosting may be determined as 4.77 dB.

Figure 13:
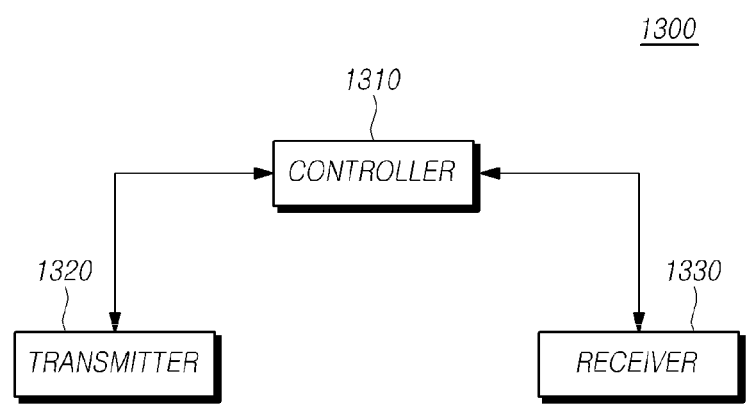
FIG. 13 is a diagram illustrating a base station according to some embodiments of the present disclosure.

FIG. 13 is a diagram illustrating a gNB according to some embodiments of the present disclosure.

Referring to FIG. 13, the gNB 1300 includes a controller 1310, a transmitter 1320, and a receiver 1330.

The controller 1310 may be configured to determine the ratio of empty REs to DMRS REs over one or more DMRS symbols and determine a DMRS power boosting based on the ratio value of empty REs to DMRS REs described above.

The gNB may transmit a DMRS to a UE through one or more DMRS REs. The gNB may transmit/receive data to/from the UE, i.e., transmit DL data to or receive UL data from the UE, through one or more empty REs.

The ratio of empty REs to DMRS REs may be determined through information indicating an effective RE pattern available to the UE among one or more available RE patterns configured by the gNB.

The available RE pattern may be comprised of REs to which a DMRS is not allocated, among REs located over one or more DMRS symbols, i.e., one or more symbols to which a DMRS can be allocated in an RB. The gNB may configure one or more available RE patterns and transmit information indicating an available RE pattern available to the UE among the configured available RE patterns. The information indicating an available RE pattern available to the UE may be transmitted to the UE through DL control information (DCI).

Further, when the gNB transmits to the UE the information indicating an available RE pattern available to the UE, instead of using a separate independent field in the DL control information, a corresponding indication information may be included in a field indicating antenna port information and then transmitted to the UE.

Further, information indicating the number of available RE patterns available to the UE may be included in the information indicating an available RE pattern available to the UE. For example, the number of available RE patterns available to the UE may be 1, 2 or 3, and, based on information on the corresponding number, the UE may recognize which available RE pattern is available (e.g. If the number is 1, 2 or 3, a first, second or third available RE pattern respectively is available.)

For example, the ratio of empty REs to DMRS REs may be determined as one of 1, 2 and 3. Further, the maximum value that the ratio value of empty REs to DMRS REs can have may be determined differently according to the DMRS configuration types.

For example, if the DMRS configuration type is a first DMRS configuration type, the maximum value of the ratio of empty REs to DMRS REs may be determined as 2, and the maximum value of DMRS power boosting may be determined as 3 dB.

For another example, if the DMRS configuration type is a second DMRS configuration type, the maximum value of the ratio of empty REs to DMRS REs may be determined as 3, and the maximum value of DMRS power boosting may be determined as 4.77 dB.

The transmitter 1320 and the receiver 1330 are used to transmit or receive signals, messages, and data necessary for carrying out some embodiments as described above, to or from the UE.

Specifically, the transmitter 1320 may be configured to transmit a DMRS to the UE with power determined based on a DMRS power boosting determined by the controller 1310.

Figure 14:
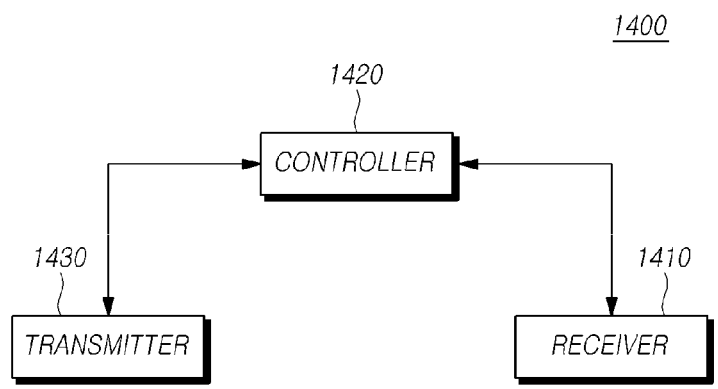
FIG. 14 is a diagram illustrating a user equipment according to some embodiments of the present disclosure.

FIG. 14 is a diagram illustrating a UE according to some embodiments of the present disclosure.

Referring to FIG. 14, the UE 1400 includes a receiver 1410, a controller 1420, and a transmitter 1430.

The controller 1410 may be configured to receive information on the ratio value of empty REs to DMRS REs over one or more DMRS symbols and receive a power-boosted DMRS according to a DMRS power boosting determined based on the ratio value of empty REs to DMRS REs described above from a gNB.

The UE may receive a DMRS from a gNB through one or more DMRS REs. The UE may transmit/receive data to/from the gNB, i.e., transmit UL data to or receive UL data from the gNB, through one or more empty REs.

The ratio of empty REs to DMRS REs may be determined through information indicating an effective RE pattern available to the UE among one or more available RE patterns configured by the gNB.

The available RE pattern may be comprised of REs to which a DMRS is not allocated, among REs located over one or more DMRS symbols, i.e., one or more symbols to which a DMRS can be allocated in an RB. The gNB may configure one or more available RE patterns and transmit information indicating an available RE pattern available to the UE among the configured available RE patterns. The information indicating an available RE pattern available to the UE may be transmitted to the UE through DL control information (DCI).

Further, when the gNB transmits to the UE the information indicating the available RE pattern available to the UE, instead of using a separate independent field in the DL control information, a corresponding indication information may be included in a field indicating antenna port information and then transmitted to the UE.

Further, information indicating the number of available RE patterns available to the UE may be included in the information indicating an available RE pattern available to the UE. For example, the number of available RE patterns available to the UE may be 1, 2 or 3, and, based on information on the corresponding number, the UE can recognize which available RE pattern is available (e.g. If the number is 1, 2 or 3, a first, second or third available RE pattern respectively is available.)

For example, the ratio of empty REs to DMRS REs may be determined as one of 1, 2 and 3. Further, the maximum value that the ratio value of empty REs to DMRS REs can have may be determined differently according to the DMRS configuration types.

For example, if the DMRS configuration type is a first DMRS configuration type, the maximum value of the ratio of empty REs to DMRS REs may be determined as 2, and the maximum value of DMRS power boosting may be determined as 3 dB.

For another example, if the DMRS configuration type is a second DMRS configuration type, the maximum value of the ratio of empty REs to DMRS REs may be determined as 3, and the maximum value of DMRS power boosting may be determined as 4.77 dB.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of transmitting a demodulation reference signal (DMRS) by a base station to a user equipment, the method comprising:
   determining a ratio of one or more empty resource elements to one or more DMRS resource elements over one or more DMRS symbols;
   determining a DMRS power boosting based on the ratio value; and
   transmitting the DMRS with power determined based on the determined DMRS power boosting to the user equipment,
   wherein a maximum value of the ratio value is differently determined according a DMRS configuration type, and
   wherein, if the DMRS configuration type is a first DMRS configuration type, the maximum value of the ratio value is determined as 2, and a maximum value of the DMRS power boosting is determined as 3 dB.

2. The method according to claim 1, wherein the ratio value is determined as one of 1, 2 and 3.

3. The method according to claim 1, wherein, if the DMRS configuration type is a second DMRS configuration type, the maximum value of the ratio value is determined as 3, and a maximum value of the DMRS power boosting is determined as 4.77 dB.

4. A method of receiving a demodulation reference signal (DMRS) by a user equipment from a base station, the method comprising:
   receiving information on a ratio value of one or more empty resource elements to one or more DMRS resource elements over one or more DMRS symbols; and
   receiving a power-boosted DMRS from the base station according to DMRS power boosting determined based on the ratio value,
   wherein a maximum value of the ratio value is differently determined according a DMRS configuration type, and
   wherein, if the DMRS configuration type is a first DMRS configuration type, the maximum value of the ratio value is determined as 2, and a maximum value of the DMRS power boosting is determined as 3 dB.

5. The method according to claim 4, wherein the ratio value is determined as one of 1, 2 and 3.

6. The method according to claim 4, wherein, if the DMRS configuration type is a second DMRS configuration type, the maximum value of the ratio value is determined as 3, and a maximum value of the DMRS power boosting is determined as 4.77 dB.

7. A base station transmitting a demodulation reference signal (DMRS) to a user equipment, the base station comprising:
   a controller configured to determine a ratio of one or more empty resource elements to one or more DMRS resource elements and determine a DMRS power boosting based on the ratio value; and
   a transmitter configured to transmit a DMRS with power determined based on the determined DMRS power boosting to the user equipment,
   wherein a maximum value of the ratio value is differently determined according a DMRS configuration type, and
   wherein, if the DMRS configuration type is a first DMRS configuration type, the maximum value of the ratio value is determined as 2, and a maximum value of the DMRS power boosting is determined as 3 dB.

8. The method according to claim 7, wherein the ratio value is determined as one of 1, 2 and 3.

9. The method according to claim 7, wherein, if the DMRS configuration type is a second DMRS configuration type, the maximum value of the ratio value is determined as 3, and a maximum value of the DMRS power boosting is determined as 4.77 dB.

* * * * *